US005661209A

United States Patent [19]
Beers et al.

[11] Patent Number: 5,661,209
[45] Date of Patent: Aug. 26, 1997

[54] PAINT FORMULATIONS

[75] Inventors: Nicolaas Cornelis Maria Beers; Geert Johannes Maria Bijl; Peter Koenders; Johanna Maria Helena Van Den Tol-Kershof, all of Amsterdam, Netherlands

[73] Assignee: Shell Oil Company, Houston, Tex.

[21] Appl. No.: 504,615

[22] Filed: Jul. 20, 1995

[30] Foreign Application Priority Data

Jul. 22, 1994 [EP] European Pat. Off. ............. 94202149

[51] Int. Cl.⁶ ................ C08J 3/09; C08K 5/01; C08L 31/06
[52] U.S. Cl. ............ 524/476; 523/500; 523/513; 524/474; 524/481
[58] Field of Search ................ 523/500, 513; 524/474, 476, 481

[56] References Cited

U.S. PATENT DOCUMENTS

| | | | |
|---|---|---|---|
| 4,036,734 | 7/1977 | Manne et al. | 208/57 |
| 4,992,406 | 2/1991 | Mauldin et al. | 502/304 |
| 5,288,805 | 2/1994 | Kodali | 525/190 |
| 5,308,511 | 5/1994 | Coppens et al. | 252/8.6 |
| 5,331,205 | 7/1994 | Lavoie et al. | 523/437 |

FOREIGN PATENT DOCUMENTS 771228  11/1967  Canada.

*Primary Examiner*—Paul R. Michl
*Assistant Examiner*—U. K. Rajguru
*Attorney, Agent, or Firm*—Dennis V. Carmen

[57] ABSTRACT

Paint formulations comprising at least one long oil alkyd resin and a solvent comprising one or more linear alkanes having a boiling range between 160° and 250° C., preferably between 170° and 200° C.

7 Claims, No Drawings

PAINT FORMULATIONS

FIELD OF THE INVENTION

The present invention relates to paint formulations based on alkyd resins.

BACKGROUND OF THE INVENTION

Paint formulations based on alkyd resins are known. An alkyd resin can be defined as the reaction product of a dibasic acid or anhydride and a polyol to which sufficient mono-functional acid or alcohol has been added to prevent gelation during processing. If an excess of dibasic acid or anhydride relative to the polyol is used, an alcohol will generally be used to esterify the acidic carboxyl groups of the reaction product of the acid or anhydride and the polyol. If, on the other hand, an excess of the polyol is used, a monofunctional acid will be used to esterify the free hydroxyl groups. Commonly applied dibasic acids and anhydrides are maleic acid and phthalic acid and their anhydrides, while commonly applied polyols are pentaerythritol and glycerol. The monofunctional acid or alcohol used for esterification purposes usually is a long chain fatty acid or alcohol. Usually a long chain fatty acid or a mixture of several long chain fatty acids is used in the form of an oil, i.e. esterified with glycerol into a triacylglycerol that melts below room temperature. Examples of commonly applied oils are linseed oil and soybean oil. The alkyd resin thus is a polymeric network of chemically linked dibasic acid or anhydride, polyol and monofunctional acid or alcohol entities. The term "long oil" in long oil alkyd resins indicates that a relatively high amount of oil has been incorporated into the alkyd resin, i.e. approximately between 55 and 80% by weight based on total weight of alkyd resin.

The alkyd resin is responsible for an increased hardness of the final paint layer after drying, thus making it water-resistant and outdoor-durable. It also contributes to the gloss of the paint layer and the color retention of the paint.

Alkyd resins as such, however, are stiff and highly viscous at room temperature. In order to get a processable paint it is therefore necessary that a solvent is added. Suitable solvents must on the one hand have sufficient solvency power to dissolve the alkyd resin and must, on the other hand, have an appropriate boiling point or boiling point range in order to be sure that the paint layer becomes dry within an acceptable period of time. It is therefore essential that the solvent is inert towards the substrate and evaporates from the paint layer within a reasonable time, or, in other words, the solvent must have such vapor pressure at ambient temperature that it can pass through and leave the polymeric network forming the paint layer sufficiently fast. It will be understood that a too short drying time is undesirable from a processing point of view, since this would make it difficult to spread the paint evenly over its substrate. A too long drying time is also undesired, since this would cause the paint to start dripping after having been brought onto its substrate. A too long drying time would also make it very time-consuming to cover a substrate with more than one paint layer and it would cause the paint layer to be soft and sticky for a relatively long period, thus leading to a paint layer of inferior quality (beside dripping, pick up of dust, less gloss and decreased hardness). Hence, the choice of the solvent is very important.

The traditional solvent used for paint formulations is white spirit, which is a mixture of alkanes, cycloalkanes and aromatic compounds and is obtained as a distillation fraction from crude oil. Its boiling point range runs from approximately 150° C. to 200° C. at atmospheric pressure. An example of a commercially available and widely used white spirit is LAWS (Trade Mark). White spirit contains significant amounts of aromatic hydrocarbons. In view of the rather penetrating odor of these solvents, for which the aromatic hydrocarbons are mainly responsible, as well as from environmental considerations, there have been proposed in the past other solvents containing no or only low amounts of aromatic hydrocarbons. Despite the generally recognized principle that the order of solvent power or cutting power decreases from aromatics to cycloalkanes to alkanes, cycloalkanes, isoparaffins (i.e. branched alkanes) and dearomatized white spirits have been used as solvents for specific resin systems, including long oil alkyd resin systems. Such solvents are commercially available. For instance, a widely used commercially available dearomatized white spirit is SHELLSOL D40 (SHELLSOL is a Trade Mark). In general, for alkyd resin-based paint formulations the cutting power of a solvent is the amount of alkyd resin which can be dissolved in the solvent while the solution has the viscosity to be readily processed using a brush. A solvent having a high cutting power is advantageous, since this implies that only a little amount of this solvent is needed for obtaining the right paint viscosity.

Dearomatized white spirit is white spirit from which substantially all the aromatics have been removed or of which substantially all the aromatics have been converted into cycloalkanes. Due to the presence of cycloalkanes, the dearomatized white spirit has good cutting power. However, a major disadvantage is the penetrating odor primarily caused by the cycloalkanes.

Cycloalkanes have a slightly lower cutting power than aromatic hydrocarbons, so that more cycloparaffinic solvent is needed for dissolving an amount of long oil alkyd resin than would be the case when an aromatic solvent is used. Their penetrating odor, however, is the major disadvantage as far as their use as solvents in paint formulations is concerned.

Isoparaffins are normally produced by alkylation reactions between $C_3$ and $C_5$ alkenes and the corresponding alkanes followed by hydrogenation. A wide range of isoparaffinic solvents is available on the market. Although isoparaffinic solvents are useful in paints, the viscosity and the retention properties of isoparaffinic solvents are not optimal in relation to their cutting power.

One known way of adjusting the viscosity of isoparaffinic solvents to the desired value is the addition of viscosity modifiers, which typically are oxygenated hydrocarbons. Another drawback of isoparaffinic solvents is the branched molecular structure, which causes them to diffuse more slowly through the alkyd resin network than linear molecules. This is particularly relevant for the last stage of the drying process when the last part of the solvent has to leave the paint layer. After most of the solvent has vanished via evaporation, a small quantity will remain trapped in the paint layer. For optimum quality, as little solvent as possible should be left in the paint layer. Usually a part of the remaining solvent will leave the paint layer via diffusion through the alkyd resin network towards the surface of the paint layer. The branched structure of isoparaffin molecules hinders that diffusion, so that a relatively large part of the trapped solvent molecules will remain in the paint layer.

It is therefore an object of the invention to provide long oil alkyd resin-based paint formulations having improved viscosity and retention properties as compared with isoparaffinic solvent-based long oil alkyd resin-based paint formulations. More specifically, the present invention aims to provide long oil alkyd resin-based paint formulations, wherein the solvent used (i) is essentially free of aromatic and cycloaliphatic hydrocarbons and other impurities, (ii) gives the paint formulation the appropriate viscosity without the need of using viscosity modifiers and (iii) has excellent evaporation properties, i.e., has a suitable boiling point range.

SUMMARY OF THE INVENTION

According to the invention, a paint formulation is provided comprising at least one long oil alkyd resin and a solvent comprising one or more linear alkanes having a boiling range between 160° and 250° C., preferably between 170° and 200° C.

DETAILED DESCRIPTION OF THE INVENTION

Linear alkanes (also referred to as normal alkanes or n-alkanes) are known as solvents. For instance, in the food industry, n-hexane is a well known extracting solvent. In solvent deasphalting techniques for removing heavy asphaltenic compounds from residual hydrocarbon oils, n-butane and n-pentane are often applied as extracting solvents. In the adhesive and rubber industry, n-pentane and n-hexane are known solvents. These lower n-alkanes, however, are not suitable for application in paint formulations because of their volatility. Although higher n-alkanes are less volatile, their application as solvents in paint formulations was generally considered inadequate, since their solvency power for alkyd resins was considered too low and since their availability on the market is rather restricted due to the limited number of applications. It has now been found that linear alkanes having a boiling range between 160° and 250° C. and mixtures of two or more of these alkanes are very suitable as solvents in paint formulations and exhibit excellent properties when used for this purpose.

Linear alkanes having a boiling point between 160° and 250° C. comprise $C_{10}$ to $C_{14}$ linear alkanes. However, since 100% pure linear $C_{10}$, $C_{11}$, $C_{12}$, $C_{13}$ or $C_{14}$ alkanes cannot be produced individually at such costs that their use as solvent in paint formulations is economically feasible, the alkane solvent used in the present invention is most adequately defined via its boiling range, i.e. the temperature range over which the solvent is boiling. A linear alkane solvent having a boiling range of 160° to 250° C. contains a major amount, i.e., at least 90% by weight and preferably at least 94% by weight, of at least one of the linear $C_{10}$ to $C_{14}$ alkanes. Other components present usually include primarily isoparaffins and small amounts of olefins, sulphur and other impurities. Particularly suitable n-alkane solvents are those having a boiling range of 170° to 200° C., which in practice are solvents containing a major amount of linear $C_{10}$ and/or $C_{11}$ alkane.

The linear alkanes which can be suitably applied in the paint formulations of the present invention can be prepared by methods known in the art. For instance, one known method for preparing higher n-alkanes is the (mol sieves) extraction from paraffin-rich hydrocarbon refinery streams. The most preferred method, however, is the Fischer-Tropsch synthesis reaction for preparing hydrocarbons from a mixture of carbon monoxide and hydrogen at elevated temperature and pressure in the presence of a suitable catalyst. Such catalysts usually comprise one or more metals of Group VIIIB of the Periodic Table of Elements, a carrier material and optionally one or more promoters. The alkanes suitable for use as solvents in paint formulations in accordance with the present invention can be obtained as distillate fractions from the product mixture of the Fischer-Tropsch synthesis reaction. Fischer-Tropsch synthesis reactions and the conditions under which such reactions are carried out are known in the art, e.g., from British patent application No. 2,077,289 and European patent applications Nos. 0,104,672; 0,147,873; 0,153,780; 0,153,781 and 0,167,215. The alkanes can obtained via this method in a relatively pure form and contain over 90% and suitably more than 94% by weight of the linear alkanes and only very small amounts of sulphur, olefins, isoparaffins and other impurities.

As has been discussed, the boiling range of a solvent in combination with the cutting power of this solvent for long oil alkyd resins largely determines its suitability for use in paint formulations. Suitable solvents have a boiling range between 160° and 250° C. and such cutting power that sufficient alkyd resin can be dissolved while the viscosity of the paint still allows smooth processing. For most painting techniques, such as using a brush or a paint bath, the appropriate long oil alkyd resin concentration in the paint formulation constitutes between 30 and 60% by weight based on total paint formulation.

Beside the long oil alkyd resin and the solvent the paint formulation may contain conventional amounts of additional ingredients usually applied in paint formulations, such as pigments and siccatives.

The invention is further illustrated by the following examples.

EXAMPLE 1

The n-paraffinic solvents used were prepared using the Fischer-Tropsch synthesis according to the following general procedure.

A cobalt/zirconium/silica catalyst was prepared following the procedure described in European Patent Application No. 0,428,223. The catalyst was loaded into a reaction vessel and reduced by contacting the catalyst with a hydrogen-containing gas. The activated catalyst was then contacted with a mixture of carbon monoxide and hydrogen having a hydrogen/carbon monoxide ratio of 1.1 at a gas inlet pressure of from 37 to 39 bar, a temperature of from 210° to 220° C. and a gas hourly space velocity of from 1110 to 1130 Nl/l/h to yield a hydrocarbon product.

The hydrocarbon product of the Fischer-Tropsch synthesis was then subjected to a mild hydrotreatment using a commercially available nickel-containing hydrogenation catalyst (ex Harshaw Catalysts) at a temperature of 220° C. and a pressure of 30 bar. The resulting product was then subjected to a conventional distillation to yield a range of n-paraffinic fractions to be applied as solvents.

The properties of the various n-paraffinic solvents obtained, i.e. solvents based on linear alkanes, are listed in Table I.

TABLE I

| Properties of n-paraffinic solvents | | | | |
|---|---|---|---|---|
| | $nC_{10}$ | $nC_{11}$ | $nC_{12}$ | $nC_{13-14}$ |
| (% area) | | | | |
| $C_9$ | 2.5 | | | |
| $C_{10}$ | 90 | 1 | <1 | |
| $C_{11}$ | 7.5 | 97.5 | 7.5 | <1 |
| $C_{12}$ | | 1.5 | 91 | 9 |

TABLE I-continued

Properties of n-paraffinic solvents

|  | nC$_{10}$ | nC$_{11}$ | nC$_{12}$ | nC$_{13-14}$ |
|---|---|---|---|---|
| C$_{13}$ |  |  | 1 | 58.5 |
| C$_{14}$ |  |  | <1 | 32.5 |
| Total n-alkanes (% wt) | 96 | 96.5 | 94.5 | 95 |
| Aromatics (ppm) | 0 | 0 | 0 | 0 |
| Sulfur (mg/l) | <0.1 | 0.10 | 0.15 | 0.15 |
| Boil. range (°C.) | 171–181 | 193–197 | 212–217 | 234–249 |
| Broomindex (mg Br/100 g) | <10 | <10 | <10 | <10 |

The percentages of the various hydrocarbon molecules having 9 to 14 carbon molecules present in the n-paraffinic solvents were determined by measuring the areas under the peaks in the gas chromatogram.

The content of linear alkanes (total n-alkanes, in % by weight) in each solvent fraction was determined according to ASTM D2140.

The content of aromatics (in parts per million) was determined using UV spectrophotometry: the ultraviolet absorption of the sample is measured either by scanning the spectrum in the region from 230 to 310 nm, or at three fixed wavelengths. The aromatics content is calculated with the aid of the baseline absorbance at. 268 nm and an empirically established absorptivity value.

The sulfur content was determined according to ASTM D3120.

The broomindex was determined according to ASTM D2710.

From Table I it is clear that the n-paraffinic solvents listed in Table I contain high levels of linear alkanes (for all solvents the total n-alkanes content is above 94% by weight) and meet the requirements of essentially zero aromatic hydrocarbon content and low level of sulphur, while the content of olefinically unsaturated compounds (as indicated by the broomindex) is also very low.

EXAMPLE 2

Alkyd resin solutions were prepared with the nC$_{10}$ and nC$_{11}$ solvents listed in Table I and with several commercially available hydrocarbon solvents having a boiling range which is similar to the boiling ranges of the nC$_{10}$ and nC$_{11}$ solvents. Alkyd resin solutions were also prepared with the nC$_{12}$ and nC$_{13-14}$ solvents listed in Table I.

The alkyd resins used were the commercial long oil phthalic anhydride-pentaerythritol-based resins URALAC AD10 (about 63% wt linseed oil) and URALAC AD43 (about 65% wt soybean oil) and they were used in concentrations of 47.8% by weight and 55.3% by weight, respectively.

The commercial solvents used were:
LAWS, a white spirit widely used in the paint industry,
SHELLSOL D40, a dearomatized white spirit,
SHELLSOL TD, an isoparaffinic solvent, and
ISOPAR J, an isoparaffinic solvent.

The properties of the alkyd resin solutions listed in Table II are: Boiling range, Dynamic Viscosity at 25° C. (DynV) expressed in mPa.s and measured with the Brookfield viscometer, and Kinematic Viscosity at 25° C. (KinV) expressed in mm$^2$/s and determined according to ASTM D445.

TABLE II

Properties of long oil alkyd resin solutions

| Solvent | Boiling range (°C.) | 47.8% w DynV | AD10 KinV | 55.3% w DynV | AD43 KinV |
|---|---|---|---|---|---|
| LAWS | 160–198 | 279 | 324 | 303 | 303 |
| SHELLSOL D40 | 162–192 | 484 | 523 | 374 | 378 |
| nC$_{10}$ | 171–181 | 540 | 635 | 362 | 392 |
| nC$_{11}$ | 193–197 | 835 | 842 | 498 | 529 |
| SHELLSOL TD | 182–200 | 1050 | 1340 | 708 | 727 |
| ISOPAR J | 172–190 | 1110 | 1139 | 768 | 741 |
| nC$_{12}$ | 212–217 | 1160 | 1275 | 545 | 566 |
| nC$_{13-14}$ | 234–249 | 1790 | 1997 | 854 | 820 |

From Table II it can be concluded that in the boiling range 160° to 200° C., the nC$_{10}$ and nC$_{11}$ solvents have significantly lower viscosities than the isoparaffinic solvents SHELLSOL TD and ISOPAR J at the same long oil alkyd resin concentration. The lower viscosities of the nC$_{10}$ and nC$_{11}$ solvents imply that less solvent is required for dissolving a given amount of long oil alkyd resin than would be the case with a comparable isoparaffinic solvent, i.e. an isoparaffinic solvent having a similar boiling range. It will be understood that this is beneficial for the drying of the paint, while it also facilitates the manufacture of the paint.

It can also be seen from Table II that the currently widely used aromatic solvent LAWS and the cycloaliphatic solvent SHELLSOL D40, which both have boiling ranges comparable with the nC$_{10}$ and nC$_{11}$ solvent, are still the solvents having the highest solvency power. However, these solvents are less desirable particularly due to their bad odor, but also from an environmental point of view. The fact that at a given concentration of long oil alkyd resin some more n-paraffinic solvent is necessary in order to obtain a processable paint, i.e. a paint having the right viscosity, as would be the case when using an aromatic or cycloaliphatic solvent, does not counterbalance the beforementioned drawbacks of aromatic and cycloaliphatic solvents.

For applications where the drying time of the paint should not be too short, the nC$_{12}$ and nC$_{13-14}$ solvents can be used. Table II demonstrates that in such a case these solvents are very useful. The formulation with the nC$_{12}$ solvent comprising 55.3% wt AD43 has even better viscosity properties than the corresponding formulations containing the isoparaffinic solvents, despite the fact that these isoparaffinic solvents have a lower boiling range.

What is claimed is:

1. A paint formulation, comprising at least one long oil alkyd resin and a solvent, said solvent comprising at least 90 percent by weight of one or more linear alkanes having a boiling range between 160° and 250° C.

2. The paint formulation of claim 1, wherein the solvent comprises one or more linear alkanes having a boiling range between 170° and 200° C.

3. The paint formulation of claim 1, wherein the solvent is obtained from a distillate fraction from a Fischer-Tropsch hydrocarbon synthesis reaction.

4. The paint formulation of claim 1, wherein said solvent comprises at least 94 percent by weight of linear alkanes.

5. The paint formulation of claim 1, wherein said paint formulation is free of viscosity modifiers.

6. The paint formulation of claim 1, wherein said solvent comprises at least 90 percent by weight of linear C$_{10}$ to C$_{14}$ alkanes.

7. The paint formulation of claim 1, wherein said solvent is free of aromatic and cycloaliphatic hydrocarbons.

* * * * *